US009595725B2

(12) United States Patent
Mathie et al.

(10) Patent No.: US 9,595,725 B2
(45) Date of Patent: Mar. 14, 2017

(54) HEATED EJECTOR ASSEMBLY FOR A FUEL CELL

(71) Applicant: Ford Global Technologies, LLC, Dearborn, MI (US)

(72) Inventors: Craig Michael Mathie, White Lake Township, MI (US); William F. Sanderson, Commerce Township, MI (US); Virgo Edwards, Commerce Township, MI (US); Fred G. Brighton, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 823 days.

(21) Appl. No.: 13/886,686

(22) Filed: May 3, 2013

(65) Prior Publication Data

US 2014/0329156 A1 Nov. 6, 2014

(51) Int. Cl.
*H01M 8/04* (2016.01)

(52) U.S. Cl.
CPC ... *H01M 8/04067* (2013.01); *H01M 8/04097* (2013.01); *H01M 8/04708* (2013.01); *H01M 8/04835* (2013.01); *Y02E 60/50* (2013.01)

(58) Field of Classification Search
CPC combination set(s) only.
See application file for complete search history.

(56) References Cited

U.S. PATENT DOCUMENTS

| | | | |
|---|---|---|---|
| 6,777,115 B2 | 8/2004 | Reiser | |
| 6,815,103 B2 | 11/2004 | Abe et al. | |
| 6,986,958 B2 | 1/2006 | Reiser et al. | |
| 7,108,928 B2 | 9/2006 | Matsuoka | |
| 7,771,663 B2 | 8/2010 | Reiser et al. | |
| 2003/0190511 A1* | 10/2003 | Yoshizawa | H01M 8/04126 429/413 |
| 2004/0081869 A1* | 4/2004 | Morishima | H01M 8/04007 429/415 |
| 2005/0202293 A1* | 9/2005 | Kagami | H01M 8/04029 429/414 |
| 2007/0243438 A1 | 10/2007 | Katano | |

(Continued)

FOREIGN PATENT DOCUMENTS

| | | |
|---|---|---|
| JP | 2005268179 A | 9/2005 |
| WO | 2008114120 A1 | 9/2008 |

*Primary Examiner* — Ula C Ruddock
*Assistant Examiner* — Osei Amponsah
(74) *Attorney, Agent, or Firm* — Brooks Kushman P.C.; Damian Porcari (57) ABSTRACT

A fuel cell system includes a fuel cell stack, an ejector in fluid communication with the fuel cell stack and having a converging-diverging (CD) nozzle with a hydrogen feed nozzle and a recirculation conduit upstream of a throat of the CD nozzle, and a thermal source configured to heat the ejector. A hydrogen supply assembly for a fuel cell system includes an ejector having a converging-diverging (CD) nozzle and a mixing chamber upstream of the CD nozzle. The mixing chamber has a recirculation conduit and a hydrogen feed nozzle. A thermal source is configured to heat the ejector. A method of controlling a hydrogen supply device for a fuel cell includes, in response to detecting a heating condition at fuel cell start up, controlling a thermal source to heat an ejector upstream of an anode stack to prevent ice formation in the ejector.

15 Claims, 4 Drawing Sheets

(56) References Cited

U.S. PATENT DOCUMENTS

| | | | |
|---|---|---|---|
| 2009/0110990 A1* | 4/2009 | Izutani | C01B 3/00 |
| | | | 429/410 |
| 2010/0068565 A1* | 3/2010 | Yadha | H01M 8/028 |
| | | | 429/410 |
| 2010/0112389 A1 | 5/2010 | Miyata et al. | |
| 2011/0097637 A1 | 4/2011 | Ko et al. | |
| 2011/0165488 A1 | 7/2011 | Janarthanam et al. | |
| 2012/0115056 A1* | 5/2012 | Meier | H01M 8/04089 |
| | | | 429/428 |

* cited by examiner

HEATED EJECTOR ASSEMBLY FOR A FUEL CELL

TECHNICAL FIELD

Various embodiments relate to a fuel cell system having a hydrogen ejector.

BACKGROUND

When exposed to freezing conditions, hydrogen fuel cell components that contain reactant fluids and water may experience operating issues due to ice that forms during or after an initial startup of the fuel cell.

For an ejector-based fuel cell system with a passive recirculation loop on the anode side, water present in the recirculation stream may freeze when the system begins operating in cold ambient temperatures or during a cold purge cycle prior to start up. For example, this water may freeze when it initially comes into the ejector and contacts cold surfaces. Alternatively, this water may freeze moments later in the mixing chamber when meeting the incoming stream of cold fresh hydrogen flowing from the primary ejector inlet. For a fuel cell application in a vehicle, the temperature of the fresh hydrogen is largely dependent on the temperature of the fuel storage tank, which likely corresponds with the ambient temperature. Additionally, the mixture of fresh and recirculated hydrogen flowing through the ejector is further cooled as it is expanded across the diffuser, presenting another opportunity for water to freeze.

Ejectors are momentum transfer devices, and as such, the passive recirculation flow they induce is a function of compression work performed by the ejector. Any pressure drops within the anode loop increase the compression work for the ejector, and may limit the recirculation flow. The dominant pressure drop in the anode loop is the fuel cell stack itself, and pressure drops across other components need to be minimized for the ejector and fuel cell to function properly. Therefore ice formation anywhere in the anode loop, including the ejector, represents additional pressure drop that may cause degradation of fuel cell performance until latent heat from fuel cell operation causes the ice to passively melt.

For a fuel cell application in a vehicle, the fuel cell needs to operate in freezing temperatures that the vehicle may encounter. The vehicle and fuel cell may be exposed to temperatures of −25 Celsius or even lower, which is well below the freezing point of water. Cold weather operating issues need to be addressed for a fuel cell vehicle to operate in climates with extreme ambient temperatures, and to meet user expectations for the vehicle.

SUMMARY

In an embodiment, a fuel cell system is provided with a fuel cell stack. An ejector is in fluid communication with the fuel cell stack and has a converging-diverging (CD) nozzle with a hydrogen feed nozzle and a recirculation conduit upstream of a throat of the CD nozzle. A thermal source is configured to heat the ejector.

In another embodiment, a hydrogen supply assembly for a fuel cell system is provided. An ejector has a converging-diverging (CD) nozzle and a mixing chamber upstream of the CD nozzle, the mixing chamber having a recirculation conduit and a hydrogen feed nozzle. A thermal source is configured to heat the ejector.

In yet another embodiment, a method of controlling a hydrogen supply device for a fuel cell is provided. In response to detecting a heating condition at fuel cell start up, a thermal source is controlled to heat an ejector upstream of an anode stack to prevent ice formation in the ejector.

Various embodiments of the present disclosure have associated non-limiting advantages. A fuel cell has an ejector on the anode side of the stack that drives a passive recirculation loop. When the fuel cell is started in cold ambient temperatures, ice may form within the ejector, and cause a decrease in fuel cell performance and instabilities within the system. The ejector and/or the hydrogen supply valve upstream of the ejector have one or more thermal sources, such as heating elements, to prevent or minimize ice formation.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Description of constituents in chemical terms refers to the constituents at the time of addition to any combination specified in the description, and does not necessarily preclude chemical interactions among constituents of the mixture once mixed.

Figure 1:
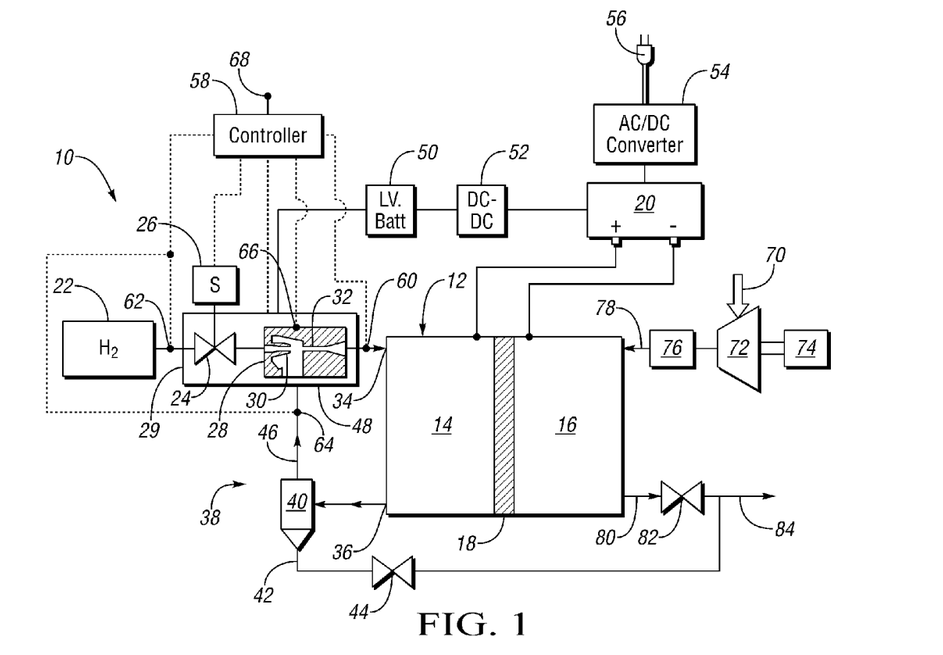
FIG. 1 illustrates a fuel cell system according to an embodiment.

FIG. 1 schematically illustrates a fuel cell system 10 as a process flow diagram according to at least one embodiment. For example, fuel cell system 10 may be used in a vehicle to provide electrical power to operate an electric motor to propel the vehicle or perform other vehicle functions. The fuel cell system 10 may be a proton exchange membrane fuel cell (PEMFC) as is known in the art. Other system architectures may also be used for the fuel cell system 10 according to the spirit and scope of the present disclosure.

The fuel cell system 10 has a fuel cell stack 12. The stack 12 contains an anode side 14, a cathode side 16, and a membrane 18 therebetween. The fuel cell system 10 electrically communicates with and provides energy, for example, to a high voltage bus 20 or a traction battery. The fuel cell stack 12 may also have a cooling loop (not shown).

During initial start-up and operation of the fuel cell system 10, product water, residual fuel such as hydrogen, and byproducts such as nitrogen, may accumulate at the anode side 14 of the fuel cell stack 12. The product stream of the anode may be collected in a separator downstream of the fuel cell stack 12. At least a portion of the liquid water and/or nitrogen may be removed by the separator, and the remaining constituents, including unused hydrogen and water vapor, may be returned to the fuel cell stack 12 via a return passageway in a recirculation loop. Conditions at fuel cell start up may be sufficiently cold such that returning water vapor and/or smaller water droplets form ice within the ejector or downstream of the ejector. Various embodiments of the present disclosure provide for systems and methods to prevent or reduce ice formation in the ejector.

A primary fuel source 22 is connected to the anode side 14 of the fuel cell stack 12, such as a primary hydrogen source. Non-limiting examples of the primary hydrogen source 22 are a high-pressure hydrogen storage tank or a hydride storage device. The hydrogen source 22 is connected to one or more hydrogen supply valves 24. The flow of hydrogen through the valve may be controlled using a solenoid 26. In one embodiment, the valve 24 and solenoid 26 operate as a pulse width modulated (PWM) valve. Of course, other hydrogen compatible valves may be used as are known in the art. The valve 24 supplies hydrogen to one or more ejectors 28. The valve and ejector may be combined into an assembly 29, or alternatively may be separate components. The ejector 28 has a primary inlet nozzle 30, or hydrogen feed nozzle, supplying hydrogen into the converging section of a converging-diverging nozzle 32. The diverging section of the nozzle 32 is connected to the input 34 of the anode side 14.

The output 36 of the anode side 14 is connected to a passive recirculation loop 38. Typically, an excess of hydrogen gas is provided to the anode side 14 to ensure that there is sufficient hydrogen available to all of the cells in the stack 12. In other words, hydrogen is provided to the fuel cell stack 12 above a stoichiometric ratio of one, i.e. at a fuel rich ratio relative to exact electrochemical needs. The recirculation loop 38 is provided such that excess hydrogen unused by the anode side 14 is returned to the input 34 to be used and not wasted.

Additionally, accumulated liquid and vapor phase water is an output of the anode side 14. The anode side 14 requires humidification for efficient chemical conversion and to extend membrane life. The recirculation loop 38 may be used to provide water to humidify the hydrogen gas before the input 34 of the anode side 14.

The recirculation loop 38 contains a separator 40, which may be a water knock-out device or other device to separate liquid water and excess nitrogen from the fluid stream. The separator 40 receives a stream or fluid mixture of hydrogen gas, nitrogen gas, and water from the output 36 of the anode side 14. The water may be mixed phase and contain both liquid and vapor phase water. The separator 40 removes at least a portion of the liquid phase water, which exits the separator through drain line 42. At least a portion of the nitrogen gas, hydrogen gas, and vapor phase water may also exit the drain line 42, and pass through a control valve 44, for example, during a purge process of the fuel cell stack 12. The remainder of the fluid in the separator 40 exits through passageway 46 in the recirculation loop 38, which is connected to the ejector 28. The fluid in passageway 46 is fed into the converging section, or mixing chamber, of the converging-diverging nozzle 32 where it mixes with incoming hydrogen from the nozzle 30 and hydrogen source 22 to humidify the hydrogen.

Icing or water buildup within the ejector 28 or elsewhere in the fuel cell system 10 may lead to decreases in cell voltage and/or voltage instabilities within the fuel cell stack 12. Icing may cause a blockage or partial blockage within the ejector 28. Icing in the diverging section of the converging-diverging nozzle 32 effectively creates a second venturi section within the nozzle 32 and may lead to pumping instabilities for the ejector 28.

The valve 24 and/or the ejector 28 may be equipped with one or more thermal sources 48, or heating elements. The thermal source 48 may be operated to prevent ice formation or melt existing ice in the ejector 28 and fuel cell system 10. In the example illustrated in FIG. 1, the thermal source 48 uses electrical energy to produce heat to warm both the valve 24 and the ejector 28. The thermal source 48 may be a positive temperature coefficient (PTC) heater, and may provide on the order of fifty watts of heat according to one non-limiting example. The thermal source 48 may also be any other resistive heating element. In other embodiments, the thermal source 48 may be a heat exchanger that is configured to heat the valve 24 and/or ejector 28 using warm fluid in a thermal circuit. The thermal circuit (not shown) may have a heating element to heat the fluid, or alternatively, the fluid in the thermal circuit may be heated using waste heat from another vehicle or fuel cell component. The valve 24 may also be operated at its maximum current while still providing the desired amount of hydrogen to heat the valve.

The thermal source 48 is electrically connected to a low voltage battery 50. The low voltage battery 50 is connected via a direct current to direct current DC-DC connector 52 to the high voltage battery 20. In other embodiments, the thermal source 48 may be directly connected to the high voltage battery 20.

In some embodiments, the high voltage battery 20 may be connected to an alternating current to direct current (AC-DC) converter 54, and to a charger 56 for connection to an external power supply to charge the battery 20. This provides for a plug-in electric, fuel cell vehicle, where the thermal source 48 may be operated using power from the external power supply when the vehicle is connected.

The thermal source 48 is in communication with a controller 58. The controller 58 may include any number of controllers, and may be integrated into a single controller, or have various modules. Some or all of the controllers may be connected by a controller area network (CAN) or other system, which in turn may be connected to other fuel cell controllers. The controller 58 receives a fuel cell system startup command and controls the system 10 to begin operation. The controller 58 may be configured to control operation of the various components of the fuel cell system 10 under any of a number of different conditions, including in a way that minimizes or reduces ice formation during startup of the fuel cell, during a cold purge process, and the like.

The controller 58 is in communication with the one or more thermal sources 48, the solenoid 26 controlling valve 24, and one or more temperature sensors. The fuel cell system 10 may have temperature sensors, such as thermistors, positioned to measure fluid or component temperatures at various locations of the fuel cell system 10. The controller 58 is shown as receiving signals representing temperature from an anode inlet temperature sensor 60, a hydrogen inlet temperature sensor 62, a recirculation stream temperature sensor 64, and an ejector body temperature sensor 66. The controller 58 may also be in communication with an ambient temperature sensor 68. The fuel cell system 10 may be configured with greater or fewer temperature sensors, and may use various predictive algorithms or calibration tables to determine the temperature at various locations within the fuel cell system 10 based on the operating conditions of the fuel cell system 10 and the ambient environment.

In one embodiment, the controller 58 is in communication with a user interface (not shown) to receive inputs from a user regarding a desired departure time. The controller 58 may also be in communication with a network or cloud computing system to determine a predictive time for fuel cell startup. The controller 58 may use a neural network, pattern based, or other algorithm to predict likely fuel cell system 10 startup times, for example, based on previous vehicle startup and departure times. The controller 58 may be in communication with a satellite system, wireless system, or the like to determine a schedule of predictive ambient temperatures based on the location of the fuel cell system, which may be determined used a global positioning satellite receiver.

The controller 58 is configured to command the thermal source to heat the valve and/or the ejector in response to a heating condition, and in response to a fuel cell system start up command to prevent ice formation in the ejector. Alternatively, the controller may command the thermal source to heat the valve and/or the ejector in response to a heating condition, and in advance of a predicted fuel cell system start up time. A heating condition is a fuel cell system condition where ice formation may potentially occur. A heating condition may be a fuel cell system component temperature or an ambient temperature being below a threshold value. A heating condition may also be based on other fuel cell system states.

Heating the ejector also provides the additional benefit of maintaining humidity in the anode recirculation stream, and delivering this humidity to the anode inlet of the fuel cell stack. Heat is conducted through the ejector body and is transferred via conduction and/or convection into the recirculation gas as it flows through the mixing chamber of the ejector. The increased temperature of the anode recirculation gas helps to offset the cold hydrogen flow from the primary nozzle 30 and the hydrogen source 22, and mitigates the condensation and dewpoint drop that results from mixing the streams, thereby providing increased humidity at the anode inlet of the fuel cell stack.

The cathode side 16 of the stack 12 receives oxygen, for example, as a constituent in an air source 70. In one embodiment, a compressor 72 is driven by a motor 74 to pressurize the incoming air. The pressurized air is then humidified by a humidifier 76 before entering the cathode side 16. Another separator (not shown) may be positioned downstream of the humidifier 76 to remove liquid water from the humidified air flow before it enters the cathode side 16 of the stack 12 at input 78. The output 80 of the cathode side 16 is connected to a valve 82. Drain line 42 from separator 40 may be connected to a line 84 downstream of the valve 82. In other embodiments, the drain lines may be plumbed to other locations in the fuel cell system 10.

Based on the use of the ejector 28 to create flow through the anode side 14 and induce flow through the passive recirculation loop 38, the ejector 28 must overcome any pressure drops in the system, which includes a typically significant pressure drop across the fuel cell stack 12. The system 10 as shown does not include a pump or other device to induce flow in the recirculation loop 38. Therefore, ice formation within the ejector 28 needs to be prevented or reduced for fuel cell performance and stability.

Figure 2:
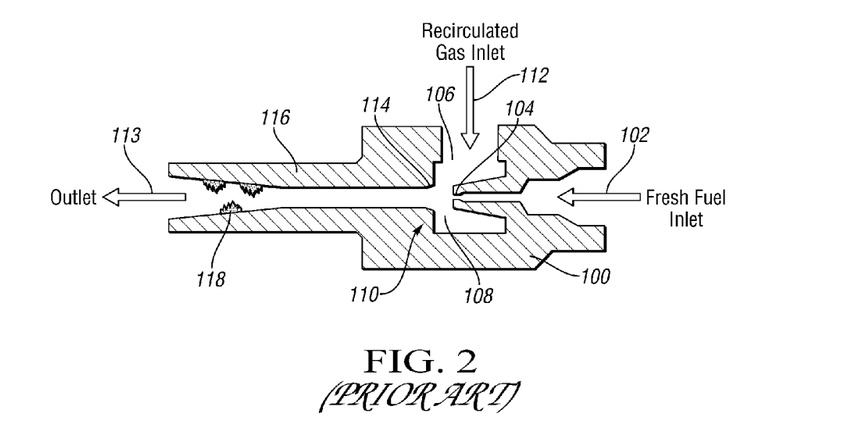
FIG. 2 illustrates an ejector in a conventional fuel cell system with ice formation.

FIG. 2 illustrates an example of ice formation in an ejector 100 in a conventional fuel cell system, for example, during a cold purge process prior to start up of the fuel cell, or at start up of the fuel cell. Hydrogen flows into the ejector 100 at 102 from a hydrogen source. The hydrogen then flows through a primary nozzle inlet 104. The hydrogen may be flowing at a high flow rate at this point, and may be near sonic speeds. The hydrogen then enters a mixing chamber 106, which is also a converging section 108 of a converging-diverging nozzle 110. Recirculation gases also enter the mixing chamber 106 at 112, and include hydrogen, water vapor, and other constituents.

The hydrogen flow entrains recirculation gases within the mixing chamber 106 and then the humidified hydrogen flow 113 flows through the throat 114 of the nozzle 110. The fluid speed at the throat 114 may reach sonic velocity as the cross-sectional area of the CD nozzle 110 decreases. The humidified hydrogen then exits the throat 114 of the nozzle 110 and enters the diverging section 116. As the cross sectional area of the diverging section 116 increases, the speed of the humidified hydrogen decreases. Within the diverging section 116, as the cross-sectional area increases, the temperature and pressure of the flow decrease. The humidified hydrogen acts as a compressible fluid and with changes in area, there are corresponding temperature and pressure changes, as are known in the art. For example, using ideal gas and reversible flow assumptions, the temperature and pressure ratios for various area ratios and Mach numbers may be easily calculated for subsonic, sonic, and supersonic flow. Similarly, pressure and temperatures may be found for more complex flows. If the flow becomes sonic or faster, an additional temperature and pressure drop occurs across a shock wave formed within a CD nozzle.

As the temperature of the flow decreases, typically within the diverging section 116, the water vapor or small water droplets may change state and form ice 118. For an ejector 100 that has been in a cold ambient environment, the temperature of the ejector material and walls may be as low as the ambient temperature. The cold walls of the ejector and cold thermal mass of the ejector 100 may assist in the ice formation and/or provide a cold surface for the ice to deposit onto. The hydrogen gas 102 temperature may also be at or below ambient temperatures due to a cold hydrogen storage device and expansion of the hydrogen through the diffuser, and contribute to ice formation.

As can be seen in FIG. 2, ice 118 within the CD nozzle 110 causes a localized reduction of cross sectional area of the nozzle in the diverging section 116. This localized reduction of cross-sectional area due to icing may lead to flow instabilities and a reduction in ejector performance.

Figure 3:
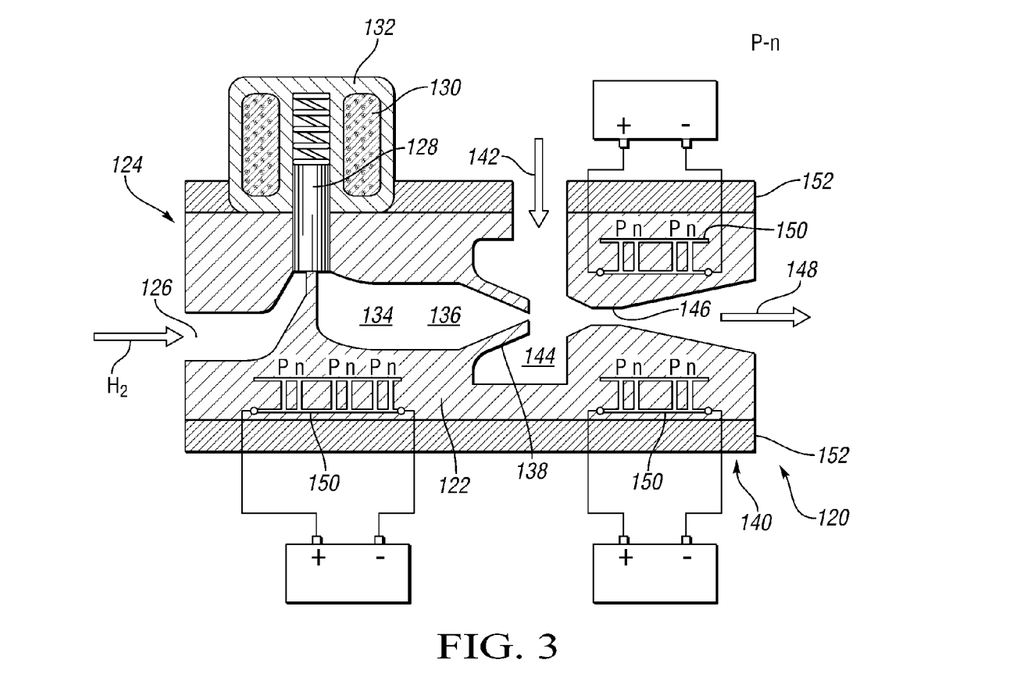
FIG. 3 illustrates a hydrogen supply valve and an ejector according to an embodiment.

FIG. 3 illustrates a combined valve and ejector assembly 120. The valve body and ejector body are integrated and formed from a single body 122. In other embodiments, the valve and the ejector may be formed separately and positioned directly adjacent to one another or spaced apart within the fuel cell, with the valve and/or the ejector having a respective heater module. The valve portion 124 is a normally closed solenoid valve. The hydrogen flow enters the valve inlet 126. Hydrogen flow is controlled by a plunger 128. The plunger is in a normally closed position, preventing flow of hydrogen unless the valve is actuated. When the coil 130 of the solenoid 132 is energized and activated, the plunger 128 is raised, and hydrogen gas flows past the plunger 128 and to the valve outlet 134. The valve 124 may be any type of solenoid valve or other valve suitable for use with hydrogen gas.

The valve outlet 134 becomes an ejector inlet channel 136 for the primary inlet nozzle 138 of the ejector portion 140 of the assembly 120. Recirculation gases flow into the ejector portion through inlet 142. The mixing chamber 144 and CD nozzle 146 are formed within the assembly 120. The humidified hydrogen flow exits the assembly at 148.

The assembly 120 has one or more thermoelectric heater modules 150. For the embodiment shown, the thermoelectric heaters are integrated into the body 122 of the assembly to heat both the valve portion 124 and the ejector portion 140. The body 122 may be made from a thermally conductive material. The thermoelectric heater module may be a thermoelectric heat pump such as a solid-state active heat pump that transfers heat from one side of the device to the other using electrical energy and the Peltier effect. The assembly 120 may also be wrapped or otherwise encased in an insulating material 152. The insulating material may cause the assembly 120 to heat at a faster rate, and/or to cool at a slower rate.

Figure 4:
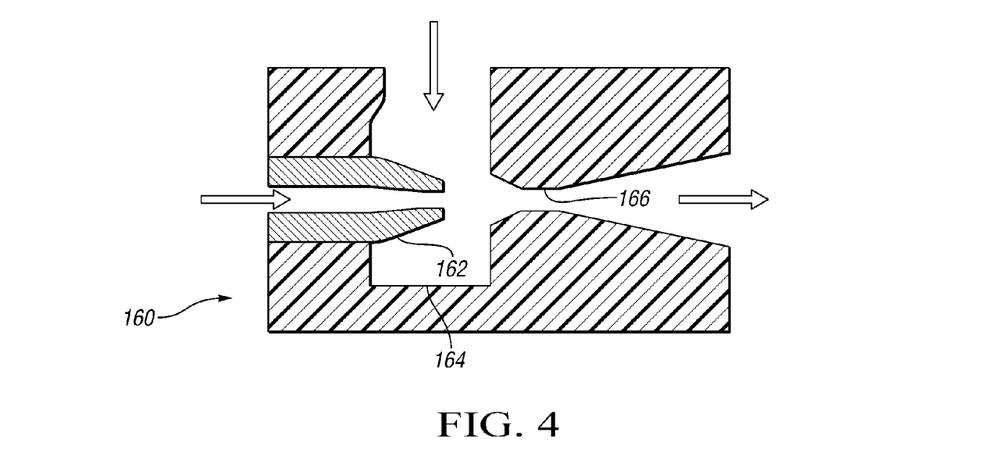
FIG. 4 illustrates an ejector according to another embodiment.

FIG. 4 illustrates another embodiment of an ejector 160 with a primary inlet nozzle 162 made from a first material, and mixing chamber 164 and CD nozzle 166 made from a second material. The ejector 160 may be heated using various techniques as discussed herein, or may be positioned downstream of a heated valve. The ejector 160 may be formed separately from a hydrogen valve. The primary inlet nozzle 162 may be manufactured from a metal such as stainless steel, or the like. The nozzle 162 is designed for use with hydrogen gas such that material degradation, embrittlement, and/or erosion caused by hydrogen gas are prevented.

The mixing chamber 164 and the CD nozzle 166 may be made from a second material such as a plastic. The second material has a lower thermal mass than the first material, and therefore, when exposed to a cold ambient environment, is slower to reach freezing temperatures. The second material may also be a hydrophobic material with a low contact angle, thereby additionally preventing water deposition and ice formation within the diverging section of the CD nozzle.

Figure 5A:
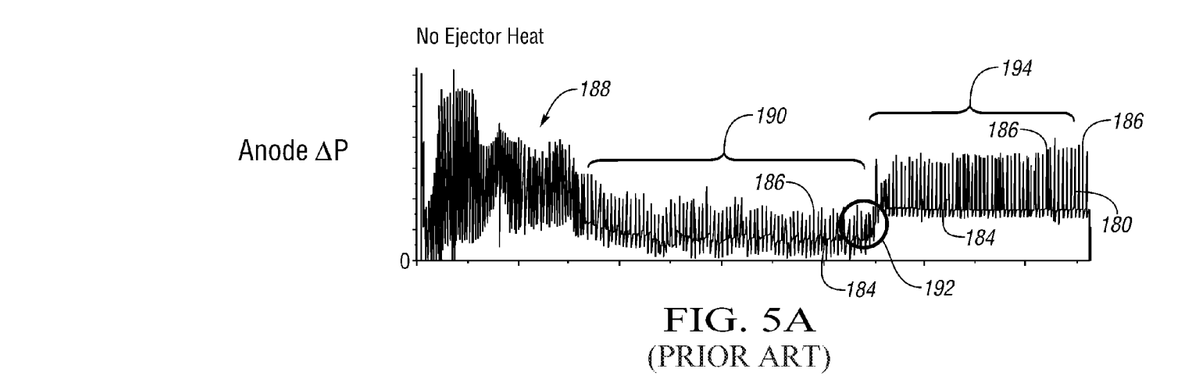
FIG. 5A illustrates the pressure drop across the anode stack for a prior art fuel cell system under freezing conditions at start up.
Figure 5B:
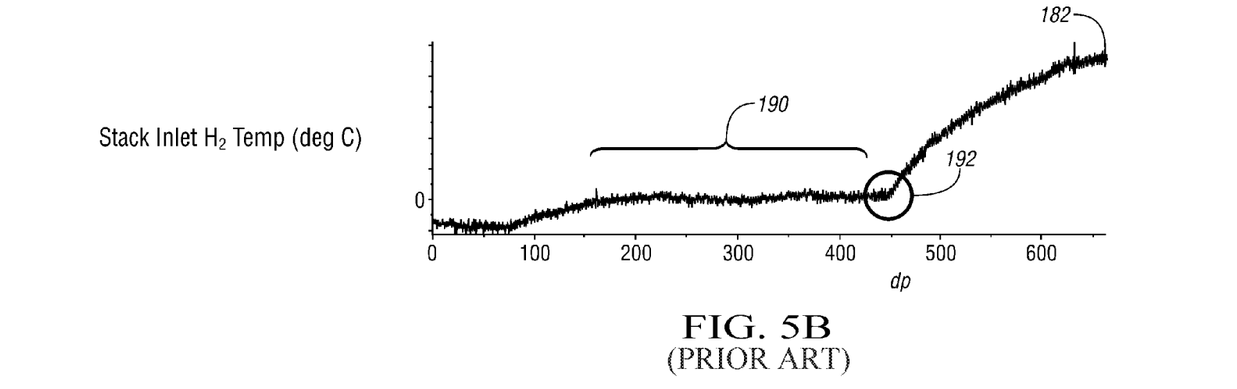
FIG. 5B illustrates the anode stack inlet temperature for a prior art fuel cell system under freezing conditions at start up.

FIG. 5 illustrates start up data from a conventional fuel cell without a heating system. FIG. 5A illustrates the pressure 180 across the anode side of the fuel cell with time. FIG. 5B illustrates temperature 182 measured at the inlet to the anode stack. The pressure across the anode 180 is indicative of flow through the system. The pressure 180 shows both a baseline value 184 as well as pulses 186. The baseline pressure 184 is caused by ejector flow. The pulses 186 are caused by purge valve activity that maintains flow through the anode stack. At an initial transient start up period at 188, the temperature of the stack inlet is below freezing, or below zero Celsius, and ice may form in the ejector. The ejector has ice formation as shown in region 190, as the pressure baseline 184 is below its typical operating pressure, and the stack inlet temperature 182 does not rise above zero Celsius. Eventually, the ice is passively melted during fuel cell operation in region 190, and at 192, the temperature 182 of the stack inlet begins to rise, and the anode baseline pressure 184 also rises to a normal operating value as shown in region 194. Note that the time to passively melt the ice may be on the order of minutes, and is approximately five minutes for the example shown with an initial temperature below freezing.

Figure 6A:
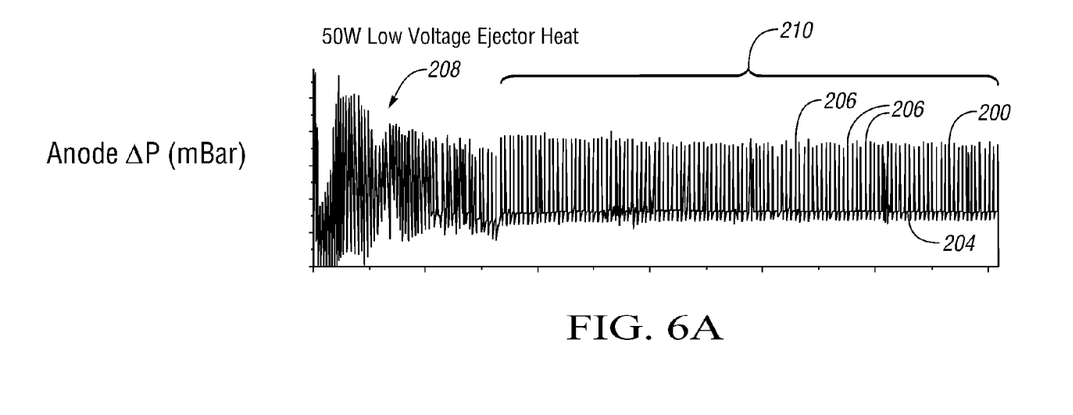
FIG. 6A illustrates the pressure drop across the anode stack for a fuel cell system having a valve and ejector according to the present disclosure under freezing conditions at start up.
Figure 6B:
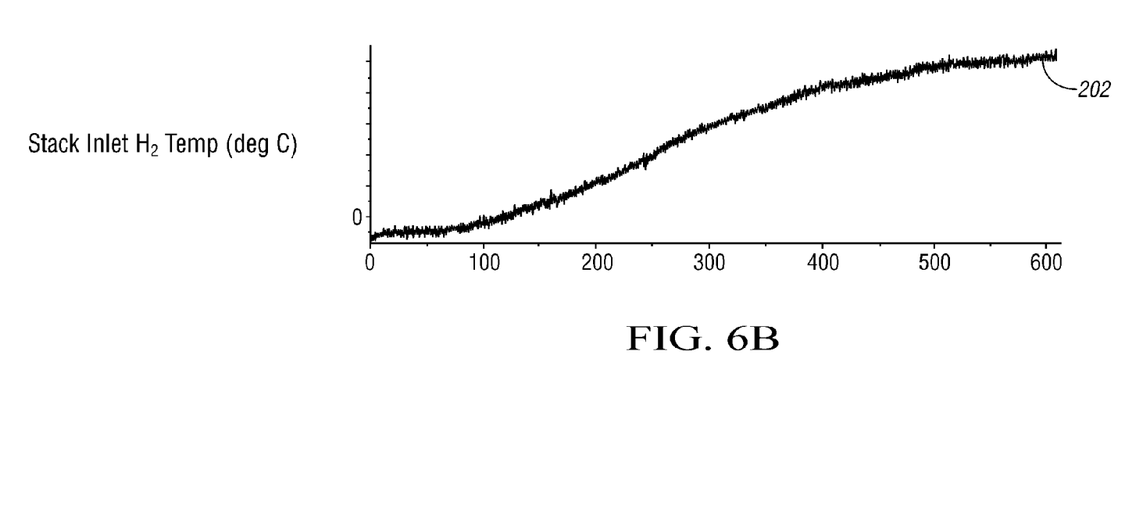
FIG. 6B illustrates the anode stack inlet temperature for a fuel cell system having a valve and ejector according to the present disclosure under freezing conditions at start up.

FIG. 6 illustrates start data from a fuel cell having a heating system according to the present disclosure. FIG. 6A illustrates pressure 200 across the anode side of the fuel cell with time. FIG. 6B illustrates temperature 202 measured at the inlet to the anode stack. The pressure across the anode is indicative of flow through the system. The pressure 200 shows both a baseline value 204 as well as pulses 206. At an initial transient start up period at 208, the temperature of the stack inlet is below freezing, or below zero Celsius. The heater for the valve and/or ejector is turned on at the beginning of the start up process illustrated in FIG. 6 or alternatively, it may be turned on prior to start up to preheat the ejector and/or valve. The heater in the example shown is a low power heater, drawing on the order of 50 Watts. The ejector has little or no ice formation as shown, as the anode baseline pressure 204 is maintained at its normal operating value, as shown in region 210, and the temperature 202 continues to rise in a smooth and continuous manner.

The thermal source used to heat the valve and/or ejector may be initiated in response to a heating condition based on various fuel cell states or other conditions. The controller may command the heater modules to begin and end heating based on inputs from temperature sensors or other fuel cell or vehicle sensors. In order for the thermal source to be commanded to operate, the ambient temperature and/or a fuel cell temperature may need to be below a predetermined threshold value. These thresholds may be zero degrees Celsius, or may be at a value above or below zero degrees Celsius.

The valve and/or ejector may be heated in response to a fuel cell start up command, or a vehicle start up command, such as a door unlock signal, or an ignition key signal. The valve and/or ejector may also be heated in response to the fuel cell beginning a cold soak process.

The valve and/or ejector may be heated in response to a fuel cell performance measures, such as the anode baseline pressure not being at its expected or predicted operating pressure, a rate of change of the anode pressure being below an expected value, or another fuel cell metric signifying potential ice formation, such as a low temperature of the mixing stream, or a low temperature of the ejector block.

The valve and/or ejector may also be heated in response to predictive information. The controller may determine a predicted startup time for the fuel cell. For example, the controller of the fuel cell may be in communication with a network or another controller that receives user inputs selecting a desired start time for the fuel cell, e.g. a vehicle departure time. The controller may be configured to predict departure times based on pattern recognition, neural networks, or other predictive algorithms. The controller may also be configured to receive information regarding predictive ambient temperature schedules, e.g. weather predictions. For example, if the controller predicts that the fuel cell will be started at 7:00 a.m. after not operating overnight, and the ambient temperature is predicted to be below freezing at that time, the controller may schedule and command the thermal source to begin heating at 6:45 a.m. in preparation for fuel cell start at seven.

Various embodiments of the present disclosure have associated non-limiting advantages. A fuel cell has an ejector on the anode side of the stack that drives a passive recirculation loop. When the fuel cell is started in cold ambient temperatures, ice may form within the ejector, and cause a decrease in fuel cell performance and instabilities within the system. The ejector and/or the hydrogen supply valve upstream of the ejector have one or more thermal sources, such as heating elements, to prevent or minimize ice formation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell system comprising:
   a fuel cell stack;
   an ejector in fluid communication with the fuel cell stack and having a converging-diverging (CD) nozzle, with a hydrogen feed nozzle and a recirculation conduit upstream of a throat of the CD nozzle;
   a hydrogen supply valve positioned upstream of the ejector and in fluid communication with the hydrogen feed nozzle of the ejector;
   a single thermal source configured to heat the ejector and the valve; and
   a controller configured to (i) measure a system temperature to determine a heating condition, and (ii) command the thermal source to heat the ejector and the valve in response to the heating condition and in response to a fuel cell system startup command.

2. The fuel cell system of claim 1 wherein the fuel cell stack has an anode side and a cathode side;
   the fuel cell system further comprising a recirculation loop in fluid communication with the anode side;
   wherein the recirculation loop is in fluid communication with the recirculation conduit of the ejector.

3. The fuel cell system of claim 1 wherein the fuel cell stack has an anode side and a cathode side; and
   wherein the ejector is in fluid communication with the anode side and upstream of the anode side.

4. The fuel cell system of claim 1 wherein the controller is further configured to command the thermal source to heat the ejector and the valve in response to the heating condition during a purge cycle.

5. The fuel cell system of claim 1 wherein the controller is further configured to (iii) receive a fuel cell system operating state to determine another heating condition, and (iv) command the thermal source to heat the ejector and the valve in response to the another heating condition.

6. The fuel cell system of claim 1 wherein the controller is further configured to command the thermal source to heat the ejector and the valve in advance of a predicted fuel cell startup time in response to the heating condition.

7. The fuel cell system of claim 1 wherein the controller is configured to command the thermal source to heat the ejector and the valve and thereby heat hydrogen fuel and anode recirculation gases in the ejector and the valve to control humidity in a fluid flow at an exit of the ejector and at an inlet to the fuel cell stack.

8. The fuel cell system of claim 1 wherein the CD nozzle is a first material and the hydrogen feed nozzle is a second material.

9. The fuel cell system of claim 1 wherein the thermal source is a positive temperature coefficient (PTC) heater.

10. The fuel cell system of claim 1 wherein the valve and the ejector are integrally formed.

11. The fuel cell system of claim 10 wherein the valve and the ejector are formed from a thermally conductive material, and are encased in a thermally insulating material, the thermal source interposed between the thermally conductive material and the thermally insulating material.

12. The fuel cell system of claim 1 further comprising a body defining the valve and the ejector such that the valve and the ejector are integrally formed, the body formed from a thermally conductive material, the body defining a valve inlet fluidly coupled to an ejector inlet channel for the hydrogen feed nozzle, the body defining a recirculation inlet and the ejector inlet channel fluidly coupled to a mixing chamber, and the body defining the mixing chamber fluidly coupled to the CD nozzle, the body supporting a plunger of the valve between the valve inlet and the ejector inlet channel; and
   an insulating layer encasing the body;
   wherein the thermal source has a thermoelectric heater module integrated into the body.

13. A fuel cell system comprising:
    a fuel cell stack;
    an ejector fluidly coupled to the fuel cell stack and having a hydrogen feed nozzle and a recirculation conduit upstream of a throat of a converging-diverging nozzle;
    a thermal source to heat the ejector; and
    a controller configured to command the thermal source to heat the ejector in response to a fuel cell system startup command and a heating condition determined based on an anode pressure.

14. The fuel cell system of claim 13 wherein the controller commands the thermal source to heat the ejector in advance of a predicted fuel cell startup time in response to the heating condition.

15. The fuel cell system of claim 13 wherein the controller determines the heating condition based on an ambient temperature being below a threshold value.

* * * * *